(12) United States Patent
Bhesania et al.

(10) Patent No.: US 8,793,786 B2
(45) Date of Patent: Jul. 29, 2014

(54) USER INDICATOR SIGNIFYING A SECURE MODE

(75) Inventors: Firdosh K. Bhesania, Kirkland, WA (US); Alain Michaud, Redmond, WA (US); Nathan C. Sherman, Bellevue, WA (US); Hirofumi Yamamoto, Bellevue, WA (US); Yashabh Sethi, Mountain View, CA (US); Steve Wright, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 835 days.

(21) Appl. No.: 12/028,297

(22) Filed: Feb. 8, 2008

(65) Prior Publication Data

US 2010/0031320 A1    Feb. 4, 2010

(51) Int. Cl.
*G06F 11/00*    (2006.01)
*G06F 12/16*    (2006.01)
*G06F 7/04*    (2006.01)
*G06F 12/14*    (2006.01)

(52) U.S. Cl.
USPC ........ 726/22; 726/2; 726/25; 726/26; 726/29; 713/100; 713/189

(58) Field of Classification Search
USPC ........ 713/100, 182, 183, 189, 194; 726/2, 16, 726/17, 21, 22, 25–30; 710/36, 37
See application file for complete search history.

(56) References Cited

U.S. PATENT DOCUMENTS

| | | | | |
|---|---|---|---|---|
| 6,054,981 A | * | 4/2000 | Kimoto et al. | 345/211 |
| 7,302,585 B1 | * | 11/2007 | Proudler et al. | 713/189 |
| 7,373,505 B2 | * | 5/2008 | Seltzer et al. | 713/166 |
| 7,904,730 B2 | * | 3/2011 | Proudler et al. | 713/189 |
| 8,479,022 B2 | * | 7/2013 | Dahan et al. | 713/194 |
| 2004/0123118 A1 | * | 6/2004 | Dahan et al. | 713/189 |
| 2004/0139351 A1 | * | 7/2004 | Tsang | 713/201 |
| 2005/0166064 A1 | | 7/2005 | Dive-Reclus et al. | |

(Continued)

FOREIGN PATENT DOCUMENTS

| | | |
|---|---|---|
| KR | 1020010075411 a | 8/2001 |
| WO | 0242891 | 5/2002 |

OTHER PUBLICATIONS

Author—"RM Tablet PC User Guide RTAB910," http://www.edu.dudley.gov.uk/ict/hardware/manuals/tabletPC_RTAB910.pdf.

(Continued)

*Primary Examiner* — Tae Kim
(74) *Attorney, Agent, or Firm* — Aaron Chatterjee; Sade Fashokun; Micky Minhas

(57) ABSTRACT

Computer-readable media, computerized methods, and computer systems for alerting a user that an operating system has entered a secure mode is provided. Initially, inputs are received at an operating system residing in a default mode. Typically, the default mode allows applications running on the operating system to access the inputs. If the inputs are identified as a call to perform a protected operation, the operating system is transitioned from the default mode to the secure mode. Typically, the secure mode restricts the applications from intercepting the inputs. The transition to the secure mode is automatically communicated to the user via an indicator device. Generally, automatic communication includes providing a message from the operating system to the indicator device over a secure pathway that triggers the indicator device to generate a user-perceivable output. Accordingly, the operating system exerts exclusive control over the operation of the indicator device.

20 Claims, 5 Drawing Sheets

(56) References Cited

U.S. PATENT DOCUMENTS

| | | | |
|---|---|---|---|
| 2005/0188210 A1 | 8/2005 | Perlin | |
| 2005/0240998 A1 | 10/2005 | Cromer et al. | |
| 2006/0020826 A1 | 1/2006 | Felton et al. | |
| 2006/0225127 A1 | 10/2006 | Roberts | |
| 2007/0033265 A1 | 2/2007 | Anderson | |
| 2007/0101148 A1 | 5/2007 | Schutz | |
| 2007/0101155 A1 | 5/2007 | Hoghaugug | |
| 2008/0022128 A1* | 1/2008 | Proudler et al. | 713/189 |

OTHER PUBLICATIONS

Microsoft Corporation—"Windows XP Tablet PC Edition frequently asked questions," http://support.microsoft.com/kb/327160.

Readycrest Ltd.—"Top 10 Benefits of the Tablet PC," http://www.readycrest.co.uk/Microsoft/tabletpc/top_10_benefits_of_the_tablet_pc.htm.

Microsoft Corporation—"Tablet PC Gives Leading Electronics Retailer the Power to Move," Published Nov. 2002, http://download.microsoft.com/documents/customerevidence/5839_Best_Buy_Tablet_PC.doc.

Surplus Mobility—"What is a Tablet PC?," 2003, http://www.surplusmobility.com/tabletpc/.

Kelly Theriot MS-MVP (DTS)—"Control, Alt, Delete," 2005, http://www.kellys-korner-xp.com/xp_cad.htm.

Super Admin—"Press Ctrl-Alt-Delete to Log In," Published Feb. 25, 2005, http://www.softwaretipsandtricks.com/windowsxp/articles/446/1/Press-Ctrl-Alt-Delete-to-Log-In.

European Extended Search Report in EP Application No. 09707489, dated Jul. 31, 2012, 6 pages.

* cited by examiner

USER INDICATOR SIGNIFYING A SECURE MODE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Presently, operating systems provide a variety of utilities that assist in providing a user access to a secure desktop. Once in the secure desktop, a user is prompted to enter privileged information, such as a login identification, a password, or other forms of authentication (e.g., fingerprint, iris scan, facial/voice recognition information, etc.). If authentic, the privileged information is utilized by the operating system to gain access to secure websites, to grant administrative rights (e.g., allowing the user to install third-party software), to login to a computing session, and to perform other operations normally prohibited to users without knowledge of the privileged information. Often, malicious applications running on the operating system attempt to record the user's privileged information when being input at the secure desktop. Upon recording the privileged information, these applications may gain unauthorized access or rights to protected information. Typically, applications carry out recording, or "sniffing," of the privileged information by rendering a display area that appears similar to a display area presented in the secure desktop, thereby prompting an unsuspecting user to provide the privileged information. Because these applications can manifest representations of many styles of legitimate display areas, a user is not likely to distinguish a counterfeit secure desktop from a valid secure desktop. Accordingly, the inability to detect a counterfeit secure desktop may cause a user to relinquish privileged information to an entity sponsoring the application, who may utilize that information for fraudulent purposes (e.g., identity theft, accessing confidential files, and the like).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention provide computerized methods, computer systems, and computer-readable media having computer-executable instructions embodied thereon for alerting a user that an operating system has entered a secure mode. In particular, incident to a transition of an environment status of the operating system from a default mode to a secure mode, an indication of the transition is automatically communicated to an indicator device. Consequently, the indicator device generates a user-perceivable output that notifies the user that the computing device is in the secure mode. As such, the user can quickly recognize that it is safe to input privileged information without the threat of an unauthorized application stealing the information.

Accordingly, in one aspect, the embodiments of the present invention provide one or more computer-readable media having computer-executable instructions embodied thereon that, when executed, perform a method for alerting a user that an operating system has entered a secure mode. Generally, the operating system is responsible for providing an alert to the user that the secure mode has been entered, while an application is not capable of replicating the secure mode. Initially, inputs are received at the operating system residing in a default mode. Typically, the default mode allows applications running on the operating system to access the inputs. The inputs are identified as a call to perform a protected operation. Upon identifying the inputs as a call to perform a protected operation, the operating system transitions from the default mode to the secure mode. Typically, the secure mode restricts the applications running on the operating system from intercepting the inputs. An indication of the transition to the secure mode is automatically communicated to an indicator device. Generally, the indicator device is configured for producing an alert to notify the user of the transition to the secure mode. When the operating system is residing in the secure mode, login credentials may be received at the operating system. Upon authenticating the login credentials, the operating system may transition from the secure mode to the default mode. An indication of the transition to the default mode is automatically communicated to the indicator device. Generally, the indicator device is configured to relax the alert, thereby notifying the user of the transition to the default mode.

In another aspect, a computerized method for controlling an indicator device located within at least one human interface device (HID) according to a user-initiated input. Initially, the system includes a computing device, a first HID, and a display device. The computing device may have an operating system residing thereon. Typically, the operating system is configured to determine whether the user-initiated input invokes a change in an environment status of the operating system. In one embodiment, the change in the environment status includes a transition between a default mode and a secure mode. The first HID may have a first indicator device disposed thereon that is exclusively controlled by the operating system. In embodiments, the first indicator device may be a light-emitting diode (LED), a display indicator, luminous device, a speaker, a Braille feedback or other accessibility input device, or a tactile-feedback device. Typically, the first indicator device may receive an indication that the user-initiated input invoked a change in the environment status of the operating system. Upon receiving the indication, the first indication device may generate a user-perceivable output. In particular, generating the user-perceivable output includes receiving a message from the operating system over a secured pathway; interpreting the message to determine whether the indication invoked a change in the environment status; and controlling the generation of the user-perceivable output based on the interpretation of the message. The display device is operably coupled to the operating system. Typically, the display device includes a user-interface (UI) display that renders a secure login screen upon receiving the indication that the user-initiated input invoked a change in the environment status of the operating system from the default mode to the secure mode. In embodiments, an application, running on the operating system, may have the capability to replicate the secure login screen at the UI display; however, the application is not able to direct the first indication device to generate the user-perceivable output. Accordingly, the user-perceivable output accurately alerts the user that the environment status of the operating system is set to the secure mode.

In yet another aspect, embodiments of the present invention relate to a computerized method for providing a user-perceivable indication of an environment status of an operating system. Generally, the method includes the following steps: tracking operations of an application that is hosted by the operating system; and determining whether the tracked operations of the application trigger a transition of the environment status from the default mode to a secure mode. If the transition of the environment status is triggered, the user is alerted of the transition by conveying a signal to an indicator device that is exclusively controlled by the operating system. Typically, the indicator device is configured to alert the user by providing the user-perceivable indication. However, If the tracked operations fail to trigger the transition of the environment status, the operating system is maintained in the default mode, thereby abstaining from conveying the signal to the indicator device.

BRIEF DESCRIPTION OF THE DRAWINGS

The present invention is described in detail below with reference to the attached drawing figures, wherein.

DETAILED DESCRIPTION

Figure 1:
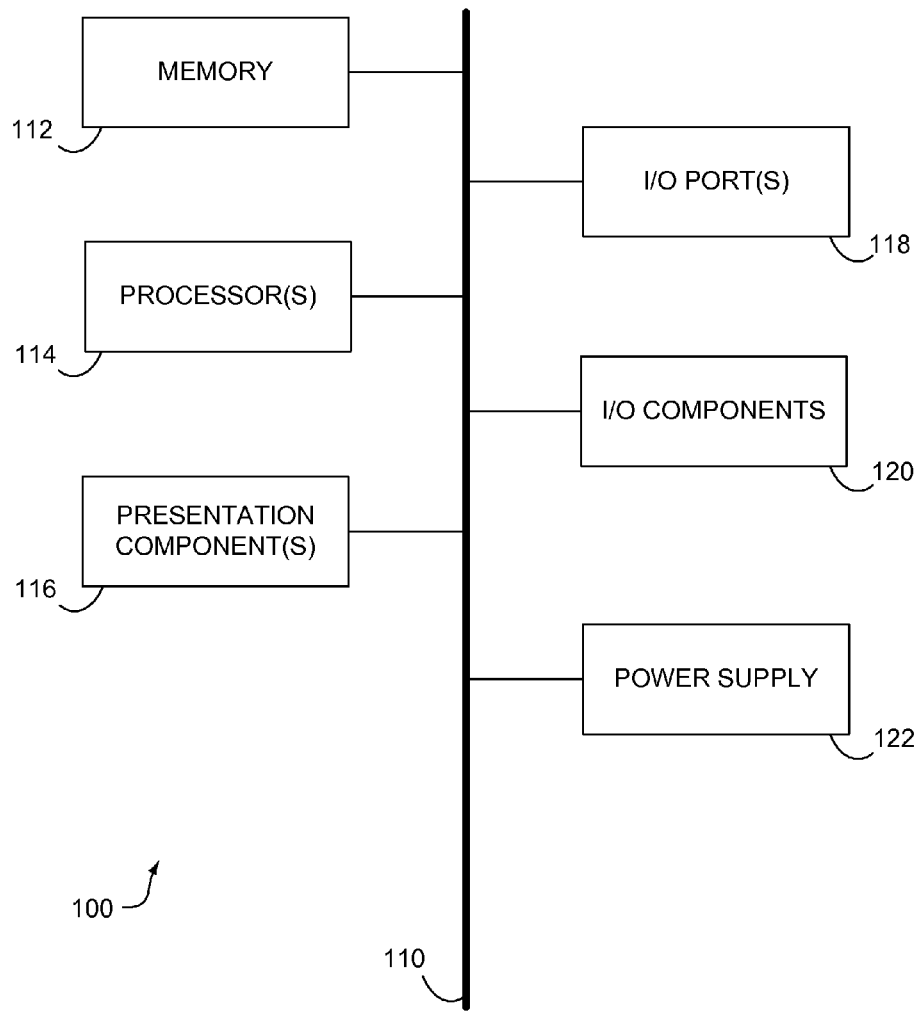
FIG. 1 is a block diagram of an exemplary computing environment suitable for use in implementing embodiments of the present invention.

The subject matter is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements or methods employed, the terms should not be interpreted as implying any particular order among or between various steps herein disclosed unless and except when the order of individual steps is explicitly described.

Embodiments of the present invention relate to computer-readable media, computerized methods, and computer systems for alerting a user that an operating system has entered a secure mode. Initially, inputs are received at an operating system residing in a default mode. Typically, the default mode allows applications running on the operating system to access the inputs. If the inputs are identified as a call to perform a protected operation, the operating system is transitioned from the default mode to the secure mode. Typically, the secure mode restricts the applications from intercepting the inputs. The transition to the secure mode is automatically communicated to the user via an indicator device. Generally, automatic communication includes providing a message from the operating system to the indicator device over a secure pathway that triggers the indicator device to generate a user-perceivable output. In other words, the operating system exerts exclusive control over the operation of the indicator device. Accordingly, the user is assured that the operating system is presently excluding malicious applications from stealing privileged information that may be input while in the secure mode.

Generally, embodiments of the present invention relate to alerting a user of a change in the environment status of an operating system. In an exemplary embodiment, a signal is automatically provided to an indicator device to notify the user that the environment status of the operating system has transitioned from a default mode to a secure mode. Generally, the default mode allows applications that are hosted (e.g., running simultaneously) on the operating system to read inputs provided to the operating system by a user (e.g., via input devices, as more fully discussed below). In one instance, the applications establish "hooks" in the operating system upon installation. These hooks allow the application to listen to keystrokes, or any other user-initiated input, provided to the operating system. Because the application can listen to the keystrokes in the default mode, the application can store the keystrokes, emulate the keystrokes, inject additional inputs between the keystrokes, or modify the keystrokes. Typically, these operations related to keystrokes, or any other user-initiated input, are utilized by the application to carry out normal processing functions. However, when in the default mode, a malicious application unintentionally installed on the operating system, may establish a hook and acquire similar access to the keystrokes, or any other user-initiated inputs. In addition, when in the default mode, the malicious application may render a manifestation of a valid secure login screen at a UI display to prompt a user to provide privileged information therein.

In order to safely provide privileged information, a user or application should change the environment status of the operating system from the default mode to the secured desktop mode. In one instance, a transition from the default mode to the secured desktop mode is affected upon identifying a user-initiated input as a call to perform a protected function. As used herein, the phrase "call to perform a protected function" is not meant to be limiting, but to encompass all inputs that invoke the operating system to request privileged information from the user. As discussed above, privileged information includes, at least, personal information, passwords, login identification, social security number, bank account numbers, credit card numbers, email addresses, user credentials, and the like. In one instance, an input that invokes the operating system to request privileged information from the user is a request to login into a bank account at a web browser application. This instance is more fully described below with reference to FIG. 4. In another instance, an input that invokes the operating system to request privileged information from the user is a command to open an application (e.g., based on licensing), or a folder (e.g., file system formatting, secured system configurations, and the like) that require administrative rights for access. In particular, applications that have administrative rights tied thereto may include a user access control (UAC) condition. In operation, upon receiving a request to manipulate this type of application, a secure login screen requesting information to satisfy the UAC condition is rendered by the application. Typically, these secure login screens simply popup windows that are presented in the context of normal computing. Accordingly, these secure login screens requesting information to satisfy the access control UAC condition are easily replicated by a malicious application. In addition, in an exemplary embodiment, incident to changing the environment status of the operating system from the default mode to the secured desktop mode, a signal is sent to an indicator device to alert the user that the secured desktop mode is established, and it is safe to submit privileged information.

In embodiments, the secure mode restricts applications hosted on the operating system from listening, or intercepting, the user-initiated inputs. Generally, the secure mode is a protective shell offered by the operating system that blocks applications from listening to keystrokes, or other inputs. In one instance, blocking is carried out be "unhooking" the hooks that have been established by applications installed on the operation system. According, the link utilized by the applications to access the user-initiated inputs is severed. That is, in the secure mode, the applications are prohibited from listening to the inputs, such as privileged information, provided by the user. Occasionally, applications may gain access to the inputs provided while in the secure mode. However, gaining access typically involves the operating system establishing a security level with a very high threshold and interrogating applications hosted on the operating system to identify secure programs that satisfy the established security level. In another embodiment, secure programs are identified from an access control list stored on the operating system. These secure programs may be provided with access to the user-initiated inputs for various reasons. But, in the secure mode, the operating system is able to determine which applications are considered secure programs, thereby filtering out the malicious programs.

Once in the secure mode, the operating system substantially locks the UI display presented on a display device. In order to unlock the UI display, one of several expected inputs should by provided to input areas rendered on the UI display (e.g., a secure login screen as discussed more fully with reference to FIG. 5). In one instance, the expected inputs include proper login credentials that satisfy an authentication procedure that is performed by the operating system, an application requiring login credentials, or a combination thereof. Upon accepting the use-provided login credentials, the environment status of the operating system grants the user access to the protected application or file, and reverts back to the default state. If the user-provided login credentials fail to satisfy the authentication procedure, upon a predefined number of attempts, the operating system will exit out of the secure mode without granting the user access to the protected application or file. In another instance, an expected input may be an exit command signifying that the user no longer intends to provide privileged information. In addition, in an exemplary embodiment, incident to changing the environment status of the operating system from the secured desktop mode to the default mode, a signal is sent to an indicator device to alert the user that the default mode is established, and it is unsafe to submit privileged information.

Although two different modes of the operating system's environment status have been described, it should be understood and appreciated by those of ordinary skill in the art that other modes could be used (e.g., hibernate mode, low-battery mode, high-processing mode, etc.) to trigger a signal to the HID, and that the invention is not limited to those modes shown and described. As such, embodiments of the present invention consider a variety of modes that are mapped to particular signals that, when communicated to HID, invoke the HID to generate an individual, or common, user-perceived output that indicates which of the variety of modes is the presently active. Further, embodiments of the present invention consider applying the structure of an indicator device that is exclusively controlled by the operating system to providing an alert at an HID upon the operating system detecting a change to any functions being executed by the operating system, an application, or other software.

Generally, the indicator device is disposed within, or on the surface of, an input device or any other device operably coupled to the operating system. In an exemplary embodiment, the indictor device is a LED located at a HID. In operation, the LED will receive a signal from the operating system via the HID that indicates the environment status of the operating system is the secure mode. This signal serves to control the function of the LED, either directly or indirectly. In particular instances, controlling the function of the LED includes instructing the LED to generate a user-perceivable output (e.g., emit illumination) or cease generating the user-perceivable output. Typically, the signal is preprocessed by the HID.

As used herein, the acronym "HID" is not meant to be limiting and may encompass any type of computer device that interacts with the user. Interaction may include receiving input from the user, delivering output to the user, or a combination thereof. By way of example only, the HID may include one or more of the following devices: a keyboard (e.g., internal keyboard of a laptop computer, external keyboard of a desktop computer), a mouse, a trackball, a joystick, a digital image recorder/player, a Braille output indicator, a graphic tablet, a game pad, a computer, an LCD display, and a monitor. In one embodiment, the HID provides a self-describing package to the operating system that contains data that assists the operating system in formatting the signal, or message, for that particular HID. Accordingly, the operating system may format the signal to the HID in a format specific to the recognized HID, thereby promoting functionality of the HID and LED, or LEDs, paired therewith. In another embodiment, the operating system is operably coupled to a driver that processes the signal prior to transmitting it to the HID. In one instance, processing includes generating a message for conveyance to the HID, where the message includes protocol that has usage definitions configured according to installation attributes of the HID, or indicator device. As discussed above, the installation attributes of the HID may be passed to the operating system as data in the self-describing package. In another instance, processing includes building security and authentication values into the signal so that the operating system exerts unique control over the HID, or indicator device.

In yet another instance, processing includes communicating the signal in a protocol (e.g., USB protocol) that defines a particular security level, thus, establishing a secure pathway between the HID and the operating system. Accordingly, in this instance, a handshaking operation between the operating system and HID is executed that allows the operating system to exert exclusive control over the HID. By way of example, exclusive control includes conditions where only the operating system may manipulate the HID, the operating system and authorized sources can manipulate the HID, or various sources can manipulate the HID, but the operating system gets the highest priority when providing a signal. Accordingly, the communication sent by the operating system may vary from a basic electrical output to a formatted signal to an encrypted message with priorities attached. In an embodiment, the formatting of the message depends on the configuration of the HID, and/or indicator device, particularly if the HID is provided with logic to interpret the message and implement the instructions embedded therein.

In an exemplary embodiment, the steps of processing the signal and communicating the signal are performed automatically upon recognizing the environment status of the operating system is the secure mode. However, these steps may be performed independently, serially, or in parallel. In addition, these steps may be performed upon a predefined delay. In other embodiments, the steps above may be carried out upon recognizing the environment status of the operating system, another mode, or the default mode. Accordingly, embodiments of the present invention consider controlling the HID to generate a user-perceivable output upon a transition to one of a variety of prescribed modes (e.g., of interest to a user), where the user-perceivable output may be distinct for each of the variety of modes, respectively.

Having described an overview of embodiments of the present invention and some of the window states featured therein, an exemplary operating environment suitable for implementing the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like refer to code that performs particular tasks, or implements particular abstract data types. Embodiments of the present invention may be practiced in a variety of system configurations, including hand-held devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
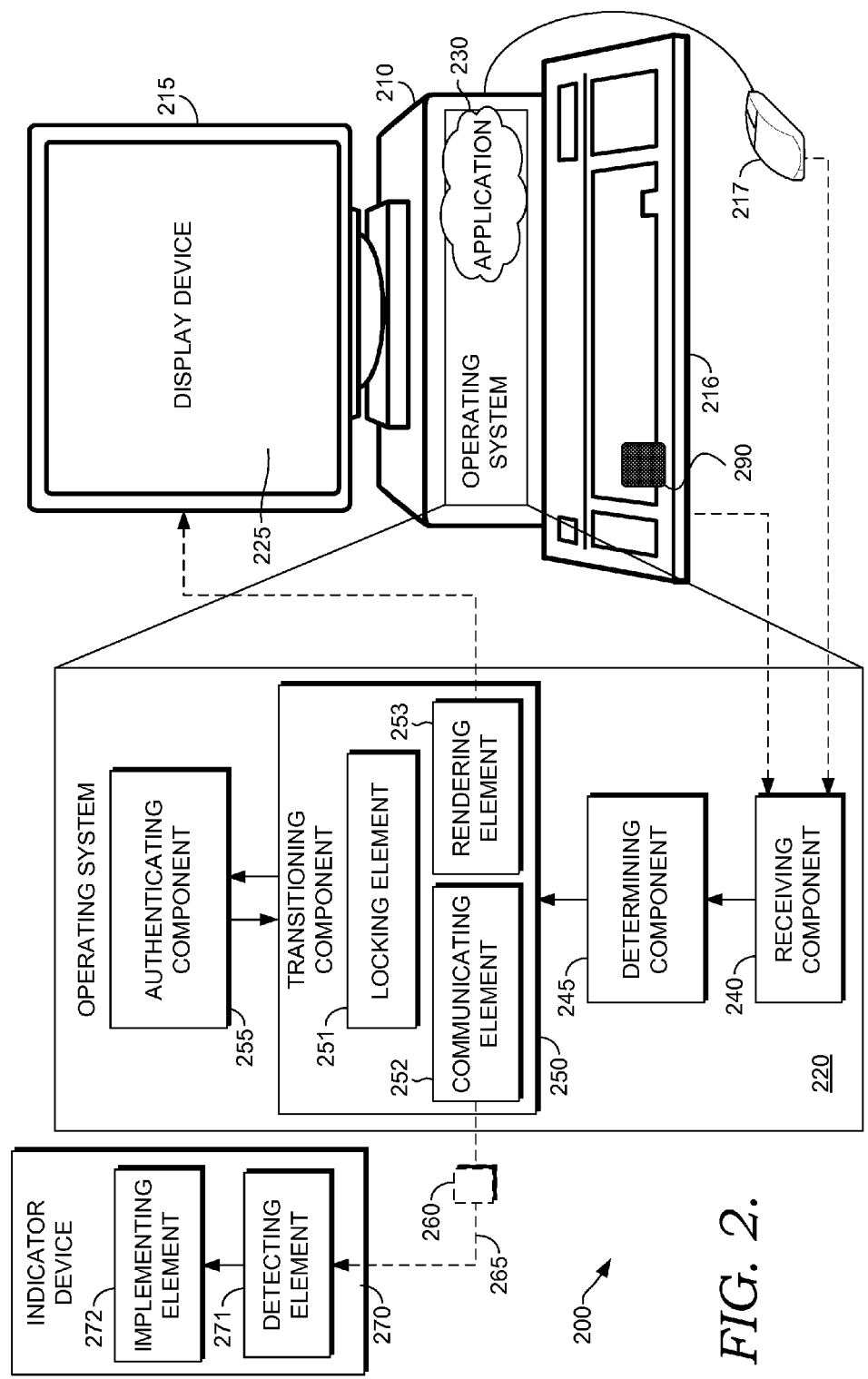
FIG. 2 is a schematic diagram of an exemplary system architecture suitable for use in implementing embodiments of the present invention.

Turning now to FIG. 2, a schematic diagram of an exemplary system architecture 200 suitable for use in implementing embodiments of the present invention is shown, in accordance with an embodiment of the present invention It will be understood and appreciated by those of ordinary skill in the art that the exemplary system architecture 200 shown in FIG. 2 is merely an example of one suitable computing environment and is not intended to suggest any limitation as to the scope of use or functionality of the present invention. Neither should the exemplary system architecture 200 be interpreted as having any dependency or requirement related to any single component or combination of components illustrated therein. Further, logic within the operating system 220 supporting the exemplary system architecture 200 may be provided as a stand-alone product, as part of a software package, or any combination thereof.

Exemplary system architecture 200 includes a computing device 210 for alerting a user that a change has occurred to the environment status of the operating system by providing an alert at an exclusively controlled indicator device. The computing device 210 may take the form of various types of computing devices. By way of example only, the computing device 210 may be a personal computing device (e.g., computing device 100 of FIG. 1), handheld device (e.g., personal digital assistant), laptop, consumer electronic device, various servers, and the like. Additionally, the computing device may comprise two or more electronic devices configured to share information therebetween.

Embodiments, of a computing device for controlling an indicator device to alert a user of the secure mode will now be described with reference to the accompanying drawings. The drawings and the associated descriptions are provided to illustrate embodiments of the present invention and not to limit the scope thereof. Reference in the specification to an "embodiment" is intended to indicate that a particular feature, structure, or characteristic described in connection with the embodiment is included in at least an embodiment of the invention. Further, the appearance of the phrase "in one embodiment" in various places in the specification are not necessarily all referring to the same embodiment. Throughout the drawings, reference numerals are re-used to indicate correspondence between referenced elements.

In embodiments, the computing device 210 includes a display device 215, input devices 216, 217, and 219, and hardware with an operating system 220 installed thereon. The computing device 210 is configured to present a UI display 225 on the display device 215. The display device 215, which is operably coupled to the computing device 210, may be configured as any presentation component that is capable of presenting information to a user, such as a monitor, electronic display panel, touch-screen, and the like. In one exemplary embodiment, the UI display 225 is configured to present a valid secure login screen (not shown), and/or to render content as required by the application 230, where a display area (see FIG. 5) is typically employed to publish content generated by application 230. In another exemplary embodiment, the UI display 225 is capable of producing fraudulent secure login screens as offered by malicious applications that are unintentionally hosted on the operating system 220.

The input devices 216, 217, and 290 are provided to provide input(s) affecting, among other things, whether the environment status of the operating system 210 is the default mode or the secure mode. Illustrative devices include a key pad (as indicated by reference numeral 216), a mouse (as indicated by reference number 217), a joystick, a login button (as indicated by reference numeral 290), a microphone, the I/O components 120 of FIG. 1, or any other component capable of receiving a user input and communicating an indication of that input to the computing device 210. By way of example only, the input devices 216 and 217 control the input of login credentials, or other privileged information, that is generally rendered at the UI display 225. In another example, the input device 216 provides a user-initiated instruction to perform a protected operation. In particular, the input device 216 may be prompted to provide the instruction to perform a protected operation (e.g., log into a secured website as discussed above) upon receiving a user input. The user input may be a hotkey, sequence of keystrokes, login key combination (e.g., Ctrl+Alt+Delete), or any other secure attention sequence (SAS) that indicates to the operating system 220 that a change on the environment status thereof has been initiated.

In addition, the input device 290 may be a physical button that is dedicated for logging into a computing session, or triggering a secure event, within the operating system 220. In one embodiment, the physical button is a physical login button that triggers a secure signal—that cannot be intercepted or otherwise tampered with—to the operating system 220 only. Upon receiving the secure signal, the operating system 220 may perform a variety of functions, including initiating a login sequence. Typically, the secure signal is communicated directly to the operating system 220 such that it is transparent to other components and/or applications. By way of example only, user-initiated actuation of the physical login button would generate a generally similar command to the Ctrl-Alt-Delete command. In another embodiment, the physical button controls a power-up function of the computing device 210 and/or a login function that invokes an initial secure login screen. Also, the physical button may be reprogrammable to provide user-initiated inputs that direct the operating system 220 to execute a variety of functions or secure events. In one instance, reprogramming the physical button includes setting the button to request the operating system 220 to perform a "fast user switch" that allows a subsequent user to log into a current session on the operating system 220. Although, various functions are described above, it should be understood and appreciated that the physical button embodiment of the input device 290 may generate a secure signal to the operating system 220 that activates any event or computing session known in the relevant art. Further, although depicted as a button disposed on the input device 216, the input device 290 may be configured as any device that accepts a single user actuation as a complete input, and may be configured to reside on any electronic device (e.g., the display device 215, the computing device 210, the input device 217, a laptop computer, and the like). Accordingly, the input device 290 provides rapid and convenient access to a secure operating system 220, by triggering the secure mode with a single motion, or click.

The operating system (OS) 220 refers generally to the software that manages the sharing of the resources of the computing device 210 and provides programmers with an interface used to access those resources. In operation, the operating system 220 interprets system data and detects user inputs (e.g., via the input devices 216, 217, and 290), and responds by executing such processes as the following: processing the one or more inputs (e.g., utilizing receiving component 240) at the operating system 220 residing in a default mode; identifying the one or more inputs as a call to perform a protected operation (e.g., utilizing determining component 245); transitioning between the default mode, the secure mode, and any other available modes (e.g., utilizing transitioning component 250); and automatically communicating an indication of the transition to the secure mode to an indicator device 270 (utilizing communicating element 252), where the indicator device 270 may produce an alert by way of an implementing element 272 therein. In embodiments, the operating system functions to perform the following logical steps: receiving one or more login credentials (e.g., utilizing the receiving component 240) at the operating system 220 residing in the secure mode; authenticating the one or more login credentials (e.g., utilizing authenticating component 255); transitioning from the secure mode to the default mode (e.g., utilizing the transitioning component 250); and automatically communicating an indication of the transition to the default mode to the indicator device 270 (e.g., utilizing the communicating element 252), where the indicator device 270 may relax the alert, thereby notifying the user of the transition to the default mode.

In an exemplary embodiment, the operating system 220 includes a receiving component 240, a determining component 245, a transitioning component 250, and an authenticating component 255. In addition, the operating system 220 may host the application 230, or multiple applications running simultaneously, thereon. Also, the operating system 220 may be operably coupled to the indicator device 270, via a secure pathway 265, and to the display device 215, thereby affecting the content being rendered at the UI display 225.

This operating-system structure of the operating-system component 220 is but one example of a suitable structure that may be run on the computing device 210 and is not intended to suggest any limitation as to the scope of use or functionality of the invention. Neither should the illustrated operating system 220 be interpreted as having any dependency or requirement relating to any one or combination of the components 240, 245, 250, and 255 as illustrated. In some embodiments, one or more of the components 240, 245, 250, and 255 may be implemented as stand-alone applications. In other embodiments, one or more of the components 240, 245, 250, and 255 may be integrated directly into the display device 215 of the computing device 210, the application 230, or a combination thereof. By way of example only, a rendering element 253 of the transitioning component 220 may be housed in association with the display device 215. It will be understood by those of ordinary skill in the art that the components 240, 245, 250, and 255 illustrated in FIG. 2 are exemplary in nature and in number and should not be construed as limiting.

Any number of components may be employed to achieve the desired functionality within the scope of embodiments of the present invention. Although the various components of FIG. 2 are shown with lines for the sake of clarity, in reality, delineating various components/elements is not so clear, and metaphorically, the lines would more accurately be grey or fuzzy. Further, although some components and devices of FIG. 2 are depicted as single blocks, the depictions are exemplary in nature and in number and are not to be construed as limiting (e.g., although only one display device 215 is shown, many more may be operably coupled to the computing device 210, thereby functioning in conjunction to present the UI display 225).

In embodiments, the receiving component 240 is configured to receive and process inputs from the input devices 216, 217, and 290 and/or tracked movements from the input device 217. It should be understood and appreciated that other inputs from various other input devices (e.g., touch-screen panel) may be received and interpreted by the receiving component 240; accordingly, the scope of the present invention is not limited to the inputs and input devices described herein. In addition, inputs may be received from applications (e.g., the application 230) without, or with limited, user interaction. As more fully discussed above, the inputs provided by applications may trigger a change in the environment status of the operating system 220, for instance, according to a UAC condition of the application. Accordingly, the receiving component 240 is capable of receiving and interpreting a variety of inputs that originated from user-initiated input events, from internal automated inputs created by applications, or from any other device that is operably coupled to the operating system.

In an exemplary embodiment, these inputs may include a call to perform a protected operation. A determination of whether the call is present in the input is conducted by the determining component 245. Initially, the determining component 245 receives a processed input from the receiving component 240. The input is analyzed to identify if the call exists within input. For instance, the determining component 245 determines whether the input, such as tracked operations of the application 230, would trigger a transition of the environment status of the operating system 220. If so, the determining component 245 extracts the call from the input and passes the call to the transitioning component 250. If not, the determining component 245 attempts to identify the contents of the input and distribute them to the appropriate locations within the operating system 220. For instance, if the input includes information related to security credentials (e.g., a scanned fingerprint file), the determining component 245 conveys the input to the authenticating component 255.

Generally, the transitioning component 250 receives calls extracted from the input by the receiving component 240 and compares the instructions within the call to the present environment status of the operating system 220. That is, if the instructions of the call direct the operating system 220 to a mode that is not the current mode, a transition process is triggered. Otherwise, the current mode is maintained. By way of example only, if the present environment status is a default mode and the instructions in the call (e.g., a login request from the login button 290) indicate an intent to change to the secure mode, a transition of the environment status is triggered. Accordingly, the indicator device 270 is alerted by conveying a signal 260 thereto over a secured pathway 265. If the instructions in the call indicate no intent to transition to the secure mode, the input fails to trigger a change of the environment status. Accordingly, the operating system 220 is maintained in the default mode, thereby abstaining from conveying the signal to the indicator device 270.

In an exemplary embodiment, the transitioning component 250 comprises a locking element 251, a communicating element 252, and a rendering element 253. Upon identifying that a transition is triggered, the locking element 521 adjusts configuration settings of the operating system 220 to correspond with the mode that is identified within the call. For instance, if the secure mode is identified, the locking component 251 sets to the configuration settings in accordance therewith. That is, in one embodiment, the locking element 251 locks out the UI display 225, operably coupled to the operating system 220, from rendering content provided by the application 230. Also, the locking element 251 may restrict the application 230 from listening to inputs provided by the input devices 216, 217, and 290. In another instance, if the default mode is identified, the locking component 251 sets the configuration settings in accordance therewith. That is, the locking component opens the operating system 220 for normal operation of applications hosted thereon. Although two examples modes are discussed above, embodiments of the present invention contemplate accepting a variety of modes at the locking element 251 and adjusting configuration settings of the operating system 220 in accordance with each accepted mode.

As discussed above, in embodiments, the rendering element 253 is configured to render content on the UI display 225 of the display device 215 according to the present environment status of the operating system 220. For instance, if a transition to the secure mode is triggered at the transitioning component 250, the rendering element 253 may direct the UI display 225 to present a secure login screen and restrict the application 230 from presenting content on the UI display 225. In another instance, if the default mode is the present environment status, then the application 230 is not restricted from rendering content on the UI display 225 by the rendering element 253.

In an exemplary embodiment, the communicating element 252 communicates the signal 265 indicating the present environment status to the indicator device 270. In one instance, the signal is provided upon triggering a transition at the transitioning component 250. In other instances, the signals 260 are provided by the communicating element 252 continuously, periodically at predefined times, at incremental intervals, or using any other transition scheme known in the relevant field of practice. The signals 260 may also take any number of forms, as more fully discussed above. In addition, the communicating element 252 provides the signals over the secured pathway 265. The secured path may be embodied as any operable coupling between the communicating element 252 of the operating system 220 and the indicator device 270.

The secured pathway 265 may be wired or wireless. Examples of particular wired embodiments of the secured pathway 265, within the scope of the present invention, include USB connections and cable connections. Examples of particular wireless embodiments of the secured pathway 265, within the scope of the present invention, include a near-range wireless network and radio-frequency technology. It should be understood and appreciated that the designation of "near-range wireless network" is not meant to be limiting, and should be interpreted broadly to include at least the following technologies: negotiated wireless peripheral (NWP) devices; short-range wireless air interference networks (e.g., wireless personal area network (wPAN), wireless local area network (wLAN), wireless wide area network (wWAN), Bluetooth™, and the like); wireless peer-to-peer communication (e.g., Ultra Wideband); and any protocol that supports wireless communication of data between devices. Additionally, persons familiar with the field of the invention will realize that a near-range wireless network may be practiced by various data-transfer methods (e.g., cable connection, satellite transmission, telecommunications network, etc.) that are different from the specific illustrated embodiment. Therefore it is emphasized that embodiments of the secured pathway 265 are not limited by the examples described, but embrace of a wide variety of methods of communications.

Generally, the authenticating component 255 functions to validate user credentials submitted in response to a valid secure login screen on the UI display 225. Validating may include executing an authentication procedure related to the application 230 or file that the user is attempting to access. In a particular instance, the authentication procedure compares the received credentials against expected security credentials to determine if a match exists. Typically, if a match exists, the authenticating component 255 authorizes a user to continue with the workflow that invoked secure login screen. In an exemplary embodiment, the secure login screen is invoked upon triggering a transition to the secure mode. Also, upon determining that the expected security credentials are satisfied, the authenticating component 255 provides an indication to the transitioning component 250 to transition from the secured desktop mode to the default mode. Also, failure conditions or time-out criteria, as discussed above, may cause an indication to be sent to the transitioning component 250 to transition from the secured desktop mode to the default mode.

The indicator device 270 is generally configured to provide an alert to a user upon receiving the signal 265 from the operating system 220. As discussed above, the indication device 270 may provide one or more types of user-perceived outputs that are based on the environment status of the operating system 220. For instance, if the indicator device 270 is an LED in a USB mouse (e.g., an HID), an indication of a transition to the secured desktop mode would be communicated by the signal 260 to the mouse, which would induce the LED to illuminate. In the example above, an indication of a transition to the default mode communicated by the signal 260 to the mouse would induce the LED turn off. In another instance, if the indicator device 270 is speaker, an indication of a transition to the secured desktop mode, communicated by the signal 260 to the speaker, would induce the speaker to broadcast continuous or intermittent sounds. In this instance, the sounds provide a reliable method for a visually impaired user to detect the operating system 220 is presenting a valid login screen. However, to accurately recognize the secured mode is activated, the user should identify the speaker that is originating the sound as the indicator device 270, and not a corollary speaker. In the example above, an indication of a transition to the default mode, communicated by the signal 260 to the speaker, would induce the speaker to turn off, or to produce a different sound.

In other embodiments, which may utilize an HID as the indicator device 270, a detecting element 271 and an implementing element 272 may be included in the indicator device. As discussed above with reference to the components 240, 245, 250 and 255, the elements 271 and 272 are expressed individually for exemplary purpose only and may, in actuality, be embodied as one or many elements. The detecting element 271 is configured to receive the signal 260, or message, from the operating system 220. In one instance, the detecting element 271 is configured to interpret the signal 260 to determine whether to invoke a change in the user-perceived output. By way of example, a signal 260 that indicates a mode similar to the previous indicated mode would not invoke a change. The implementing element 272 is generally configured to control the type and duration of the user-perceived output according to the interpretation of the signal 260. For instance, modes may by mapped to varying levels of illumination, or frequencies for flashing a bulb, of an LED. Utilizing the interpretation of the signal 260, the implementing element 272 invokes the appropriate, or mapped, output to occur (e.g., associated with the present mode).

Figure 3:
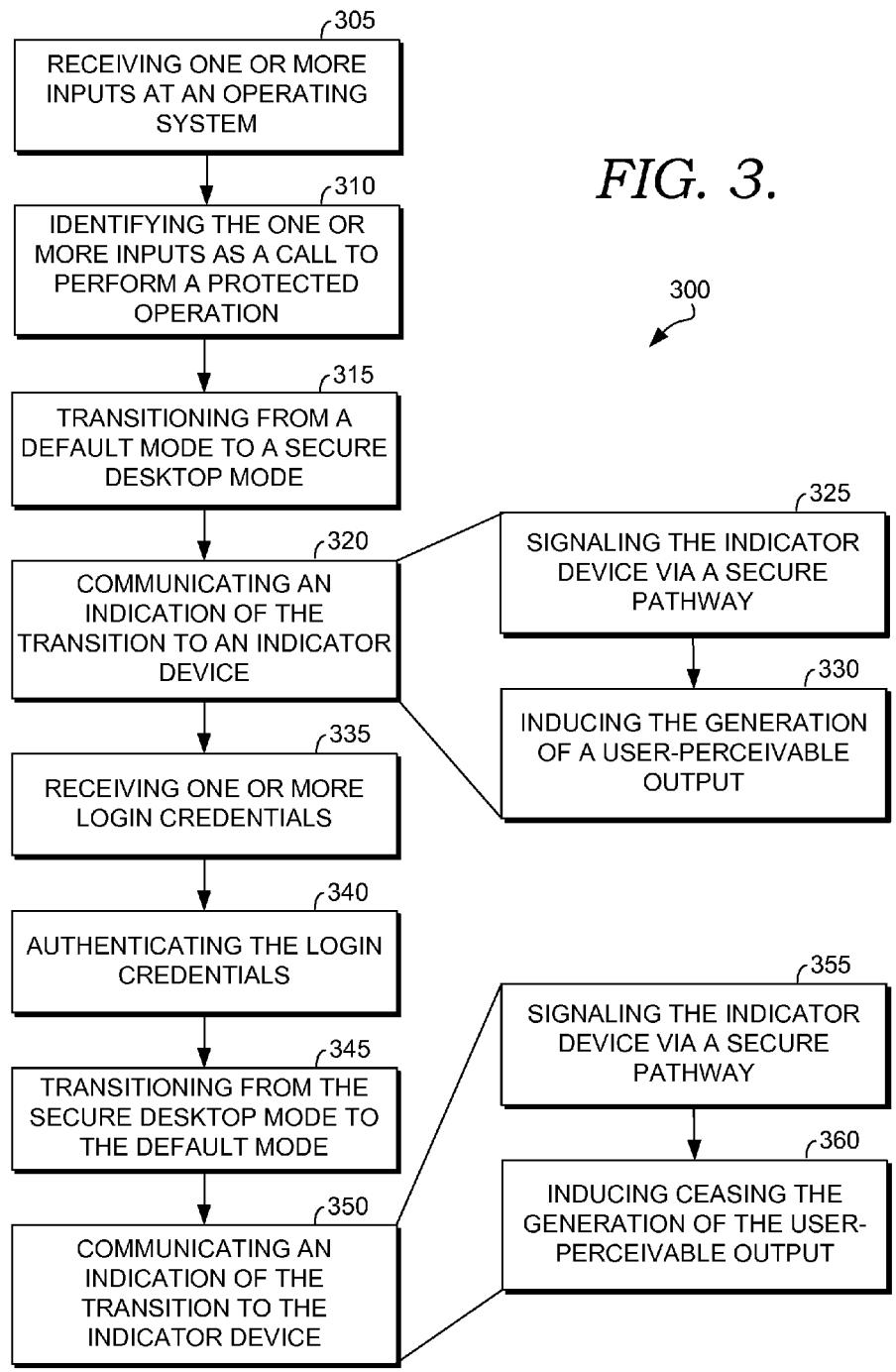
FIG. 3 is a flow diagram illustrating an overall method for alerting a user that an operating system has entered a secure mode, in accordance with an embodiment of the present invention.

Turning now to FIG. 3 a flow diagram is shown that illustrates an overall method 300 for alerting a user that an operating system has entered a secure mode, in accordance with an embodiment of the present invention. Initially, one or more inputs are received at an operating system (e.g., the operating system 220 of FIG. 2), as indicated at block 305. These inputs may be identified as a call to perform a protected operation, as indicated at block 310. If identified as a call, the operating system is transitioned from a default mode to a secure mode, as indicated at block 315. As indicated at block 320 an indication of the transition is communicated to an indicator device (e.g., the indicator device 270 of FIG. 2). In particular embodiments, communication is carried out by signaling the indicator device via a secure pathway, as indicated at block 325. Accordingly, generation of a user-perceivable output is induced, as indication at block 330.

As indicated at block 335, one or more login credentials are received. An authentication procedure is performed on the login credentials (see block 340), and if they are valid, or cause the operating system to exit the secure mode, a transition to the default mode is triggered (see block 345). As indicated at block 350, an indication of the transition is communicated to an indicator device. In particular embodiments, communication is carried out by signaling the indicator device via a secure pathway, as indicated at block 355. Accordingly, ceasing the generation of a user-perceivable output is induced, as indication at block 360.

Figure 4:
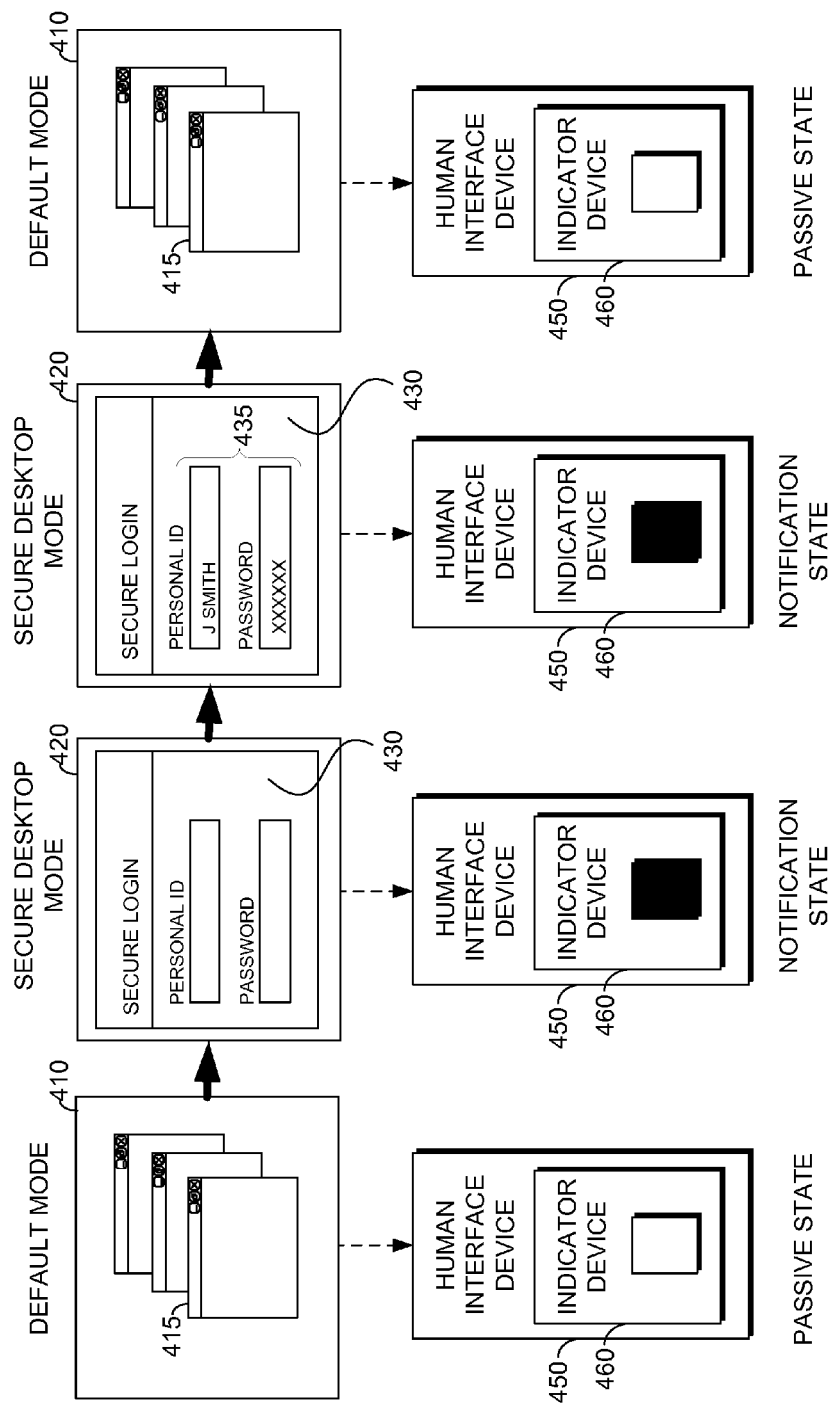
FIG. 4 is a progressive screen display illustrating stages for transitioning an indicator device between a passive state and a notification state, in accordance with embodiments of the present invention.

With reference to FIG. 4, a progressive screen display 400 illustrating stages for transitioning an indicator device between a passive state and a notification state is shown, in accordance with embodiments of the present invention. Initially, an operating system is in the default mode. As such, a UI display is in the normal condition 410, thereby allowing applications to render content 415 thereon and listen to user-initiated inputs. Also, an HID 450 is operably coupled to the operating system (e.g., via a secured pathway that provides for exclusive control over the indicator device 460). The HID 450 receives a signal, or some indication, that the operating system is residing in the default mode and accordingly invokes a passive state at the indicator device 460. The passive state causes the indicator device 460 to alert a user that the operating system is not in a secure mode and to refrain from providing privileged information.

Upon a trigger to transition to the secure mode, the UI display is switched to a locked condition 420. In the locked condition 420, the UI display provides a secure login screen 430 and the operating system restricts applications from listening to inputs provided by the user. Also, the HID 450 receives an indication that the operating system is in the secure mode (e.g., via the signal 260 of FIG. 2), and invokes the indicator device 460 to change states to a notification state. In the notification state, the indicator device 460 alerts the user that it is safe to provide privileged information as security credentials 435 to satisfy the secure login screen 430. Upon satisfying the authentication procedure, which operates in the background of the secure login screen 430, the operating system reverts back to the default mode. Accordingly, the HID 450 is notified of the transition, and the indicator device 460 is invoked to provide an appropriate user-perceived output, if any, corresponding to the default mode.

Although one indicator device 460 is shown, embodiments of the present invention contemplate various combinations of indicator devices. In one instance, a second HID that controls, or houses, a second indicator device, which is exclusively controlled by the operating system, may be provided. Typically, the second indicator device is configured for generating a user-perceivable output upon receiving an indication that an input has triggered a change in the environment status of the operating system. In particular, a user-perceivable output generated by the second indicator device may correspond with the user-perceivable output generated by the indicator device 460.

Figure 5:
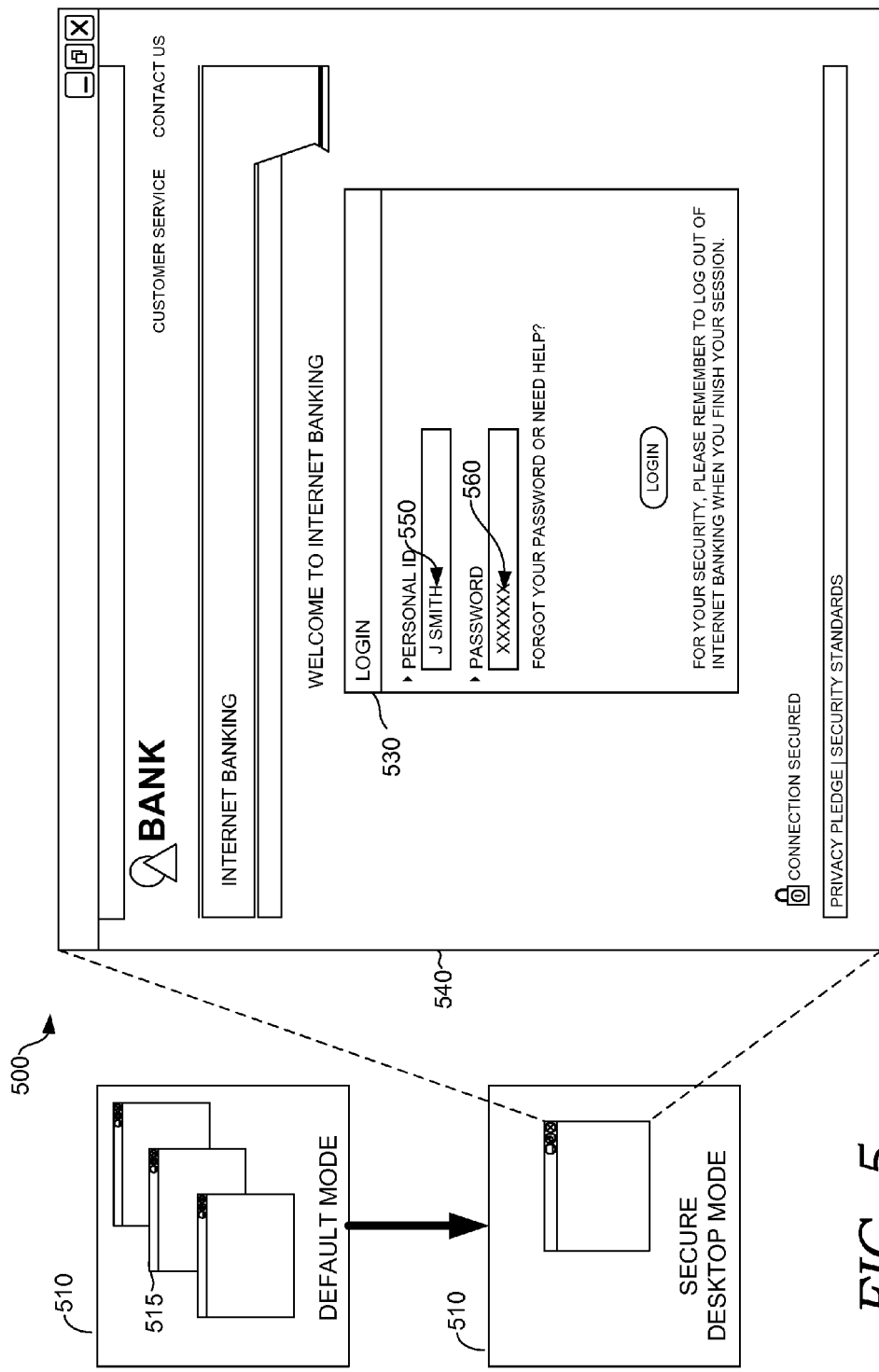
FIG. 5 is a diagrammatic view of an exemplary UI display providing a secure login screen, in accordance with an embodiment of the present invention.

Turning now to FIG. 5, a diagrammatic view of an exemplary UI display 510 providing a secure login screen 540 is shown, in accordance with an embodiment of the present invention. Initially, in the default mode, applications are allowed to render content 515 on the UI display 510. Incident to transitioning to the secure mode, the secure login screen 540 is presented. In this instance depicted, a login entry area 530 is provided for a user to enter security credentials comprising a personal ID 550 and a password 560. Because an indicator device is alerting the user that the operating system is blocking out malicious applications, s/he may confidently enter privileged information without a threat of identity theft. Upon authentication of the security credentials, a web browser, which is accessing a bank website as shown, allows the user to continue with accessing an appropriate account. Accordingly, the indicator device reliably notifies the user when, and when not to, provide privileged information.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-storage media having computer-executable instructions embodied thereon that, when executed by a processor, perform a method for alerting a user that an operating system has entered a secure mode, the method comprising:
tracking operations of an application that is running on the operating system, wherein the environment status of the operating system is a default mode;
determining whether the tracked operations of the application trigger a transition of the environment status from the default mode to the secure mode, wherein, in the secure mode, the application is prohibited from reading inputs to the operating system initiated by a user;
transitioning from the default mode to the secure mode upon determining that one or more of the tracked operations of the application trigger the transition to the secure mode;
presenting secure input areas on a UI display that, upon receiving one or more expected inputs, allow for unlocking the UI display; and
automatically communicating a secure indication from the operating system to an indicator device operably coupled to a computing device supporting the operating system, wherein the indicator device is exclusively controlled by the operating system and only the operating system may manipulate the indicator device, and wherein, upon receiving the indication, the indicator device produces an alert to notify the user the operating system transitioned to the secure mode.

2. The media of claim 1, wherein the one or more of the tracked operations that trigger the transition to the secure mode result from a user-initiated instruction to perform the protected operation via the application.

3. The media of claim 2, wherein the user-initiated instruction is initiated by actuating a physical button.

4. The media of claim 3, wherein initiating the user-initiated instruction to perform the protected operation by actuating the physical button comprises detecting a secure attention sequence (SAS) event from a peripheral device.

5. The media of claim 1, further comprising:
receiving one or more forms of login credentials at the operating system residing in the secure mode;
authenticating the one or more forms of login credentials; and
transitioning from the secure mode to the default mode.

6. The media of claim 5, further comprising, incident to transitioning from the secure mode to the default mode, automatically communicating an indication of the transition to the default mode to the indicator device, wherein the indicator device is configured for relaxing the alert, thereby notifying the user of the transition to the default mode.

7. The media of claim 1, wherein restricting the applications running on the operating system from intercepting the one or more inputs comprises:
establishing a security level to gain access to user-initiated inputs; and
interrogating the applications running on the operating system to identify secure programs of the applications that satisfy the security level.

8. The media of claim 1, wherein automatically communicating the transition to the secure mode to the indicator device comprises conveying a message to the indicator device, wherein the message includes protocol with usage definitions configured according to attributes extracted at an installation of the indicator device.

9. The media of claim 1, wherein the tracked operations that trigger the transition to the secure mode comprise at least one of a call to perform a protected operation, a prompt to the operating system to request privileged information, a request to login into a secure account, or a command to open or manipulate an application that requires administrative rights for access.

10. A computerized method for providing a user-perceivable indication of an environment status of an operating system, the method comprising:
tracking operations of an application that is hosted by the operating system, wherein the environment status of the operating system is a default mode;
determining whether to trigger a transition of the environment status from the default mode to a secure mode as a function of the tracked operations of the application, wherein, in the secure mode, the application is prohibited from reading inputs to the operating system initiated by a user;
initiating the transition of the environment status from the default mode to the secure mode upon identifying one or more of the tracked operations comprise a prompt to the operating system to request privileged information;

when the transition of the environment status is triggered, alerting the user of the transition by taking actions comprising:
  (a) presenting secure input areas on a UI display that, upon receiving one or more expected inputs, allow for transitioning from the secure mode; and
  (b) conveying a signal to an indicator device that is exclusively controlled by the operating system and only the operating system may manipulate the indicator device, wherein the indicator device is operably coupled to a computing device that supports the operating system, and wherein the indicator device is configured to alert the user by providing the user-perceivable indication; and if the tracked operations fail to trigger the transition of the environment status, maintaining the operating system in the default mode, thereby abstaining from conveying the signal to the indicator device.

11. The method of claim 10, wherein the indicator device is configured to reside in a passive state when the operating system is in the default mode and to adjust to a notification state that signifies the operating system is in the secure mode by providing the user-perceivable indication.

12. The method of claim 10, further comprising transitioning the environment status to the default mode upon receiving a security credential that satisfies an authentication procedure of the application.

13. The method of claim 12, further comprising, upon transitioning the environment status to the default mode, adjusting the indicator device residing in the notification state to the passive state that signifies the operating system is in the default mode.

14. The method of claim 10, wherein the prompt to the operating system to request privileged information comprises at least one of a request to login into a secure account, or a command to open or manipulate an application that requires administrative rights for access.

15. A computer system for exclusively controlling an indicator device located within at least one human interface device (HID) according to a user-initiated input, the system comprising:
  a computing device having an operating system residing thereon, wherein the operating system is configured to determine whether the user-initiated input invokes a change in an environment status of the operating system between three or more modes of the operating system, wherein the three or more modes of the operating system include the secure mode and the default mode;
  a first HID having a first indicator device disposed thereon that is exclusively controlled by the operating system and only the operating system may manipulate the first indicator device, wherein the first indicator device is configured for receiving an indication that the user-initiated input invoked a change in the environment status of the operating system and for generating three or more distinct user-perceivable outputs that each correspond to a respective mode of the three or more modes; and
  a second HID for presenting secure input areas that, upon receiving one or more expected inputs, allows for transitioning to the default mode.

16. The system of claim 15, wherein the first indicator device includes at least one of an light-emitting diode (LED), a display indicator, luminous device, a speaker, or a tactile-feedback device.

17. The system of claim 15, wherein the first indicator device is further configured for:
  receiving a message from the operating system over a secured pathway;
  interpreting the message to determine whether the indication invoked change in the environment status; and
  controlling the generation of the user-perceivable output based on the interpretation of the message.

18. The system of claim 17, further comprising a third HID having a second indicator device exclusively controlled by the operating system, wherein the third indicator device is configured for generating a user-perceivable output upon receiving the indication that the user-initiated input invoked a change in the environment status of the operating system such that the user-perceivable output generated by the third indicator device corresponds with the user-perceivable output generated by the first indicator device.

19. The system of claim 15, wherein the first HID is configured to provide the user-initiated input to the operating system.

20. The system of claim 15, wherein the second HID comprises a display device operably coupled to the operating system, wherein the display device includes a user-interface (UI) display that is configured to render a secure login screen upon receiving an indication that the user-initiated input invoked a change in the environment status of the operating system from the default mode to the secure mode.

* * * * *